United States Patent
Schlitz et al.

(10) Patent No.: US 7,770,699 B2
(45) Date of Patent: Aug. 10, 2010

(54) BRAKE DISK COMPRISING A FRICTION RING AND A LINKING ELEMENT

(75) Inventors: Helmut Schlitz, Hildrizhausen (DE); Hans-Georg Riedel, Pforzheim (DE); Bjoern Spangemacher, Sindelfingen (DE)

(73) Assignee: Daimler AG, Stuttgart (DE)

( * ) Notice: Subject to any disclaimer, the term of this patent is extended or adjusted under 35 U.S.C. 154(b) by 804 days.

(21) Appl. No.: 10/556,262

(22) PCT Filed: May 3, 2004

(86) PCT No.: PCT/EP2004/004652

§ 371 (c)(1),
(2), (4) Date: Mar. 28, 2007

(87) PCT Pub. No.: WO2004/102025

PCT Pub. Date: Nov. 25, 2004

(65) Prior Publication Data

US 2007/0181388 A1    Aug. 9, 2007

(30) Foreign Application Priority Data

May 14, 2003    (DE) ............................... 103 21 795

(51) Int. Cl.
*F16D 65/12* (2006.01)
(52) U.S. Cl. ............................... 188/218 XL; 188/18 A
(58) Field of Classification Search ............... 188/18 A, 188/73.31, 73.32, 218 XL; 301/6.1, 6.7, 301/6.8
See application file for complete search history.

(56) References Cited

U.S. PATENT DOCUMENTS

| | | | |
|---|---|---|---|
| 4,645,041 A * | 2/1987 | Bass ..................... | 188/218 XL |
| 4,662,482 A | 5/1987 | Bass | |
| 6,139,215 A * | 10/2000 | Kuhne et al. ............... | 188/18 A |
| 6,247,562 B1 * | 6/2001 | Gotti et al. ............ | 188/218 XL |
| 6,267,210 B1 | 7/2001 | Burgoon et al. | |
| 7,219,776 B2 * | 5/2007 | Bauer et al. ........... | 188/218 XL |
| 2002/0157908 A1 | 10/2002 | Burgoon et al. | |
| 2008/0135351 A1 * | 6/2008 | Kirschner et al. ..... | 188/218 XL |

FOREIGN PATENT DOCUMENTS

| | | |
|---|---|---|
| DE | 94 22 141 U1 | 5/1998 |
| DE | 199 43 537 C1 | 12/2000 |
| DE | 102004034676 A1 * | 2/2006 |
| EP | 0 987 462 A1 | 3/2000 |
| WO | WO 02/38979 A1 | 5/2002 |

* cited by examiner

*Primary Examiner*—Thomas J Williams
(74) *Attorney, Agent, or Firm*—Patent Central LLC; Stephan A. Pendorf

(57) ABSTRACT

A brake disk with a friction ring (2) and a linking element (4) which are interconnected by a threaded fastener arrangement (6). The threaded fastener arrangement (6) encompasses a screw, a nut, and an intermediate element (12). The intermediate element (12) prevents direct contact between the friction ring (2) and the linking element (4). Also provided is a sleeve element (14) that is disposed on a shaft (16) of the screw (8). A sliding block (18) is plugged onto the sleeve element (14). The intermediate element (12) at least partly encloses the sliding block such that thermal expansions acting in a radial direction can be compensated by a relative movement between the sliding block (18) and the intermediate element (12). The intermediate element also has a springy effect in an axial direction, whereby mechanical and thermal stresses can be compensated in the axial direction.

3 Claims, 3 Drawing Sheets

BRAKE DISK COMPRISING A FRICTION RING AND A LINKING ELEMENT

CROSS REFERENCE TO RELATED APPLICATION

This application is a national stage of PCT/EP2004/004652 filed May 3, 2004 and based upon DE 103 21 795.9 filed May 14, 2003 under the International Convention.

BACKGROUND OF THE INVENTION

1. Field of the Invention

The invention relates to a brake disk comprising a friction ring and a linking element.

2. Related Art of the Invention

A brake disk of this type is known from EP 0 987 462.

EP 0 987 462 A1 describes brake disk comprising a friction ring and a linking element, which are interconnected by threaded fastener means (nut-and-bolt arrangement). In this case the nut-and-bolt arrangement comprises a bolt, an intermediate element, a washer and a nut. Here the bolt of the threaded fastener means extends through the bore of the linking element as well as the bore of the friction ring. The intermediate element is arranged such that it prevents contact between friction ring and linking element. The disadvantage of this arrangement is the inability of the friction ring and the linking element to expand in the axial or radial direction.

In DE 94 22 141 U1 another bolted-together arrangement of a friction ring and a linking element of a brake disk is described. Here a spring washer below the screw head enables axial expansion between friction ring and linking element. A disadvantage of this invention is the direct contact between friction ring and linking element which, especially when using dissimilar materials, likely results in corrosion. Moreover, this invention does not provide for radial expansion.

SUMMARY OF THE INVENTION

The object of the present invention is to provide a connection between friction ring and linking element allowing for radial and axial expansion which additionally prevents corrosion between friction rings and linking element.

The present invention describes a brake disk with a friction ring and a linking element which are interconnected by means of a threaded fastener arrangement. The threaded fastener arrangement includes a screw, a nut and an intermediate element in which the intermediate element is arranged such that it prevents direct contact between friction ring and linking element. The invention features a sliding block which is at least partially pushed over a sleeve element. The intermediate element is arranged such that it at least partially encloses the sliding block. Thereby the design of intermediate element provides a resilient force between friction ring and linking element in the axial direction.

According to the invention the intermediate element prevents contact between friction ring and linking element, thereby preventing corrosion between these two components. This arrangement is especially advantageous in the case that the friction ring is made from a ceramic material and the linking element is made from an aluminum alloy. In this case the intermediate element also prevents local deformations of the linking element, which can occur at elevated temperatures. Concurrently, by providing a resilient force, the linking element allows for an axial expansion between friction ring and linking element.

The design of the sliding block allows for thermal expansion of the friction ring and the linking element in radial direction. Thus friction ring and linking element have a degree of freedom in axial and radial direction, whereby mechanical stress occurring during braking is significantly reduced.

In an advantageous embodiment of the invention the friction ring features a circumferential retainer ring within itself. This retainer ring features fixing holes and allows screwing the linking element to the friction ring.

In another advantageous embodiment of the invention the linking element features oblong recesses in the radial direction. These oblong recesses can be open to the outside resembling the form of pinnacles or they can have the form of a slotted hole. The oblong recesses allow for a radial expansion of the threaded fastener arrangement through the sliding block which is hung into the oblong recesses and can sufficiently move in radial direction.

In one embodiment of the invention the intermediate element is designed as a U-shape. The long sides of the U-shaped intermediate elements feature flaps which fit into the oblong recesses of the linking element. The U-shape design and the flaps of the intermediate element securely lock the intermediate element in the oblong recesses and prevent direct contact between the linking element and the friction ring.

In another advantageous embodiment of the invention the flaps of the intermediate element feature resilient moldings. These resilient moldings provide a resilient force of the intermediate element in axial direction. Here it is advantageous that the intermediate element can simply be punched out of sheet metal and folded, hence reducing production cost.

BRIEF DESCRIPTION OF THE DRAWINGS

Advantageous embodiments of the invention will be described in detail with the illustrations below. They show.

DETAILED DESCRIPTION OF THE INVENTION

The brake disk according to the invention is of the customary type of construction with a friction ring (2) and a linking element (4). The friction ring (2) features internal ventilation (not show here) which is confined between two friction surfaces (also not shown). Brake pads (not shown) are used to create a retarding effort on theses friction surfaces.

Preferably the friction ring is made from a carbon fiber reinforced ceramic material, e.g. a carbon fiber reinforced silicon carbide ceramic (C/SiC). Such ceramic materials show a high wear resistance and durability at high temperatures. Their mechanical strength however is slightly inferior compared to gray cast iron.

In order to keep the cost down the geometry of these friction rings needs to be simple. For that reason a brake disk made from C/SiC-material is preferably made from two pieces such that the friction ring (2) is connected to a linking element (4). In technical terms this linking element (4) is called the brake disk hub. The linking element (4) preferably consists of an aluminum alloy, furthermore optimizing the weight advantage already given by the very lightweight friction ring with respect to a conventional gray cast iron brake.

The utilization of different materials, the ceramic for the friction ring (2) and the aluminum in the linking element (4), in connection with the very high temperatures developing during the brake application results in different thermal expansion of the individual components. To avoid mechanical stress, which would inevitably result from this, a special connection between the friction ring (2) and the linking element (4) is required.

Figure 1:
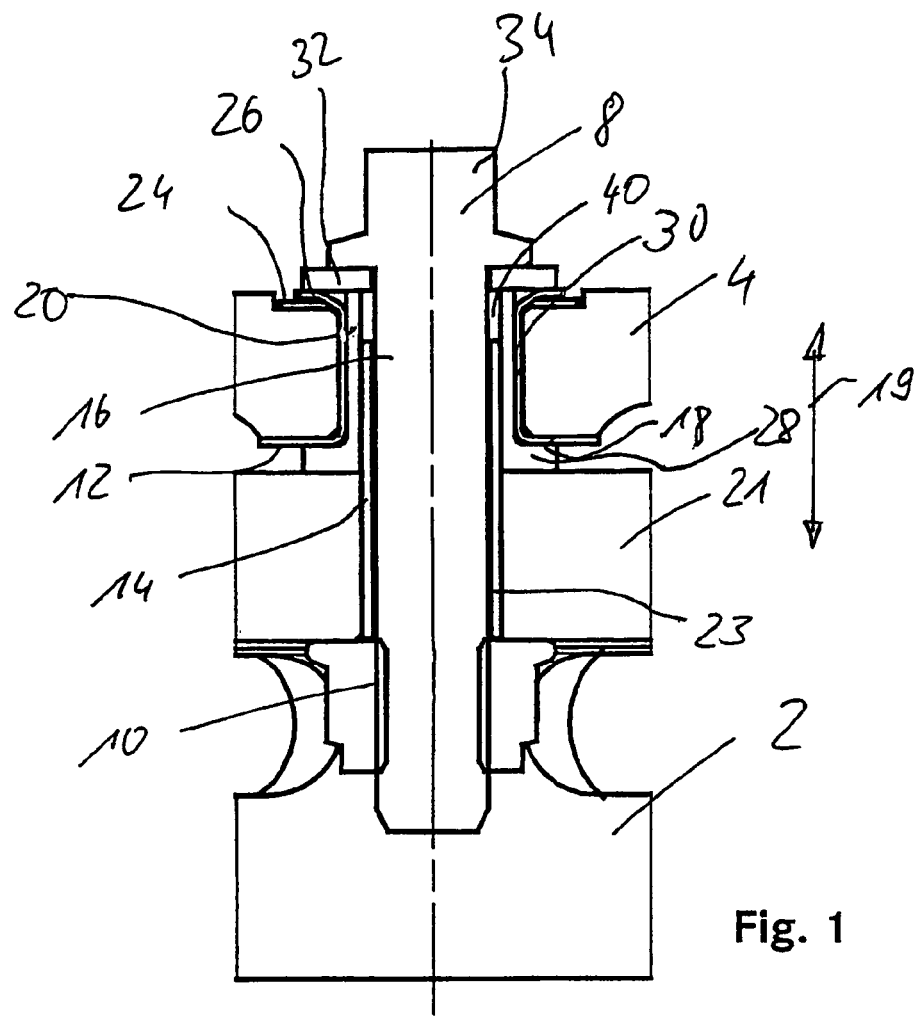
FIG. 1 a cross-sectional view through a brake disk with a friction ring and a linking element in the region of the threaded fastener arrangement, FIG. 2 a perspective representation of an intermediate element, FIG. 3 an intermediate element which is inserted into the oblong recesses of the linking element, FIG. 4 an intermediate element which is inserted into the oblong recesses of the linking element with radial suspension.

Such a threaded fastener arrangement (6) is illustrated in FIG. 1. The threaded fastener arrangement (6) comprises a screw (8), preferably a bolt, with a shaft (16), which is secured by a nut (10). The threaded fastener arrangement (6) runs through an oblong recess (20) in the linking element (4) and through a fixing hole (23), which is located within an inner retainer ring (21) of the friction ring (2). Around the shaft (16) of the screw (8) a sleeve element (14) is located, which prevents a direct contact between the fixing hole (23) and the oblong recess (14) and the screw's shaft (16). Above the sleeve element (14) a sliding block (18) is located. The sliding block (18) is essentially of cylindrical shape, but features two parallel faces or recesses (30) which are arranged such that they can slip into the oblong recesses (20) of the linking element (4). The parallel recesses (30) of the sliding block (18) in turn create shoulders in the sliding block (18) which, as shown in FIG. 1, serve as spacers between the linking element (4) and the retainer ring (21) of the friction ring (2).

Figure 2:
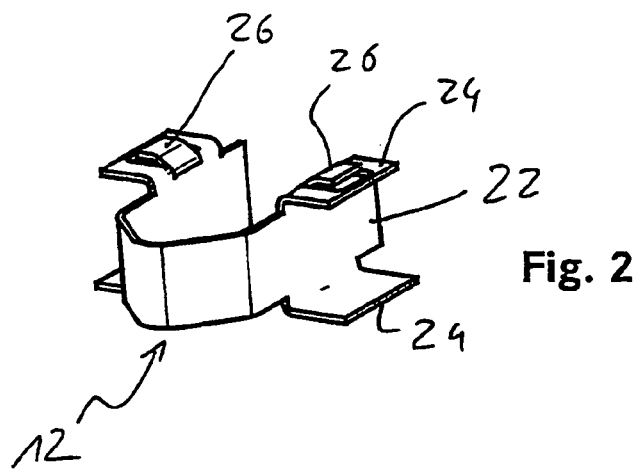

Furthermore an intermediate element (12) is provided, which is arranged around the oblong recesses (20) of the linking element (4). The intermediate element (12) itself is illustrated in more detail in FIG. 2. The intermediate element (12) is essentially U-shaped and features flaps (24) on its long sides (22). In the example on hand according to FIG. 2 resilient moldings (26) are punched out of these flaps (24). These resilient moldings (26) push, as shown in FIG. 1, onto a washer (32), which in turn directly contacts the screw head (34). The resilient moldings (26) provide enough play enabling the entire threaded fastener arrangement (6) including the friction ring (2) and the linking element (4) to expand in the axial direction. Axial thermal expansions in the region of the screwing assembly (6) will be compensated by the resilient moldings (26).

Another reason for an axial play of the screwing assembly is based upon the mode of functioning of the brake caliper (not shown here). The brake caliper is one-sided rigidly mounted with respect to the brake disk. During braking a force acts onto the disk in the region of the brake caliper. Hence an axial moment acts upon the disk, the friction ring (2) the linking element (4) and the threaded fastener arrangement (6). In order to compensate for the mechanical stress caused by this axial moment, an axial play within the threaded fastener arrangement (6) is useful, which in turn is compensated by the resilient moldings (26).

Another advantageous aspect of the invention is based upon the freedom of movement of the sliding block (18). In the cross sectional view of FIG. 1 the direction of this movement of the sliding block (18) is perpendicular to the plane of the drawing.

Figure 3:
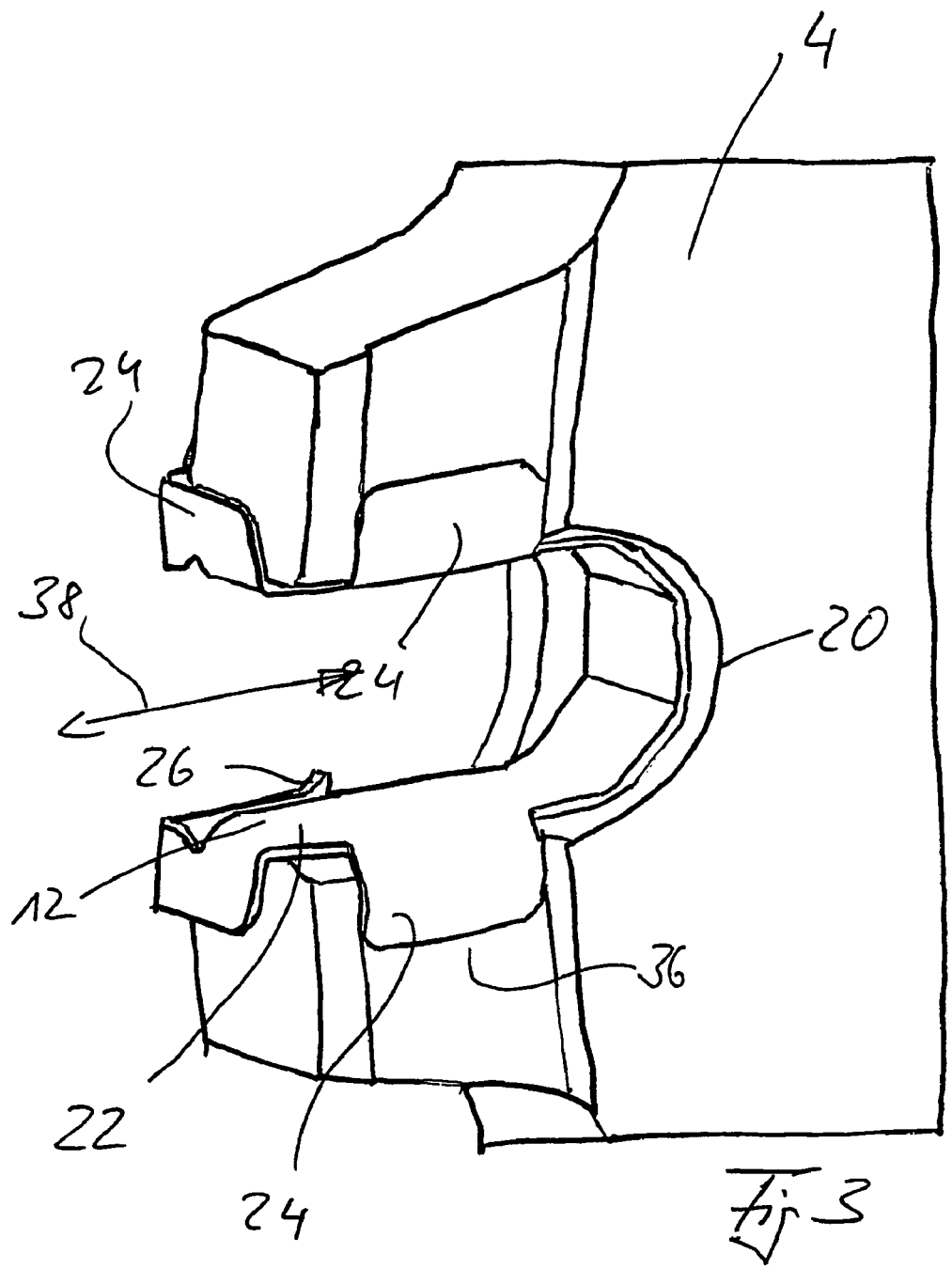
Figure 4:
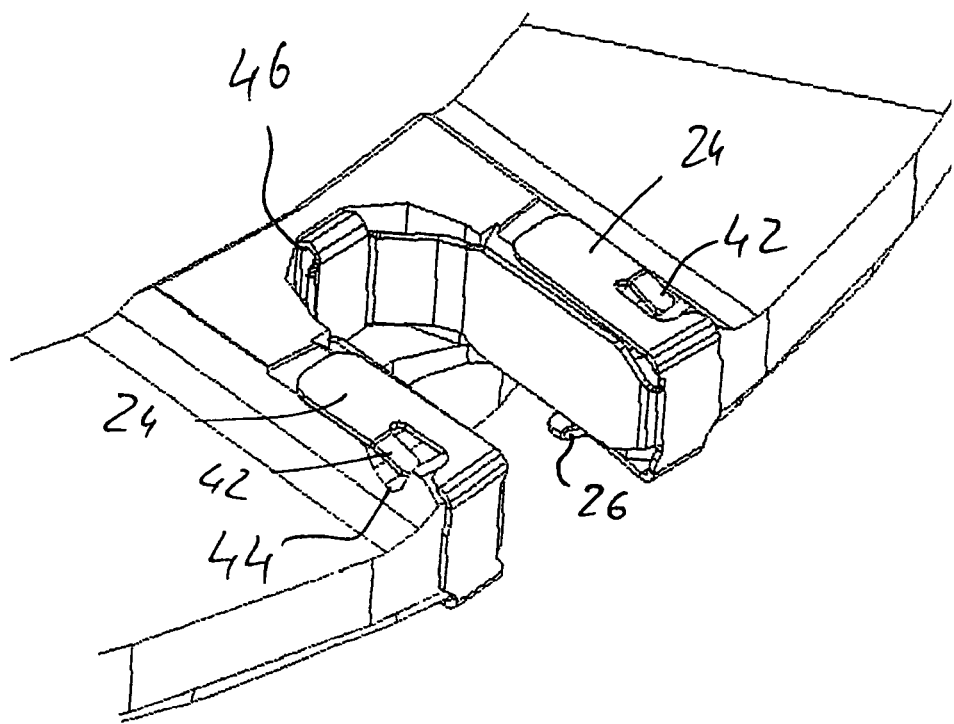

In FIG. 3 an oblong recess (20) is slipped into the intermediate element (12). The U-shaped design of the intermediate element (12) is adjusted to the form of the oblong recess (20). The flaps (24) of the intermediate element (12) are bent such that they are positioned above boundaries (36) of the oblong recesses (20), thereby retaining the intermediate element (12) in axial and radial direction within these oblong recesses (20). It should be noted that the intermediate element (12) in FIG. 3 is not identical with the one in FIG. 2. The intermediate element (12) in FIG. 3 is merely another advantageous embodiment. Another example for an embodiment of an intermediate element (12) is shown in FIG. 4. In this embodiment the intermediate element (12) is radially arrested by means of a locking feature (44) of the linking element (4). In the assembly process the intermediate element (12) is slipped into the oblong recesses (20) of the linking element (4). Once it reaches the correct position the flap locking features (42) engage with the locking features (44) of the linking element (4). The locking feature (44) in this case is either a cavity in or a ridge on the linking element (4). In the case of a cavity the flap locking features (42) are bent from the flap (24) into the direction of the linking element (4).

In addition a radial suspension (46) of the intermediate element (12) at the lower end of the U-shaped intermediate element (12) ensures firm fit of the intermediate element (12) in the oblong recess (20).

The radial locking (42, 44) of the intermediate element (12) together with the radial suspension (46) ensures that the intermediate element (12) remains in place with respect to the linking element (4). Relative radial movements (caused by thermal expansion of the linking element (4) and the friction ring (2)) occur between the sliding block (18) and the intermediate element (12). Thus material abrasion in the relatively soft material of the linking element (4) (usually an aluminum alloy) is prevented. A material abrasion like this may cause noise of the brake.

The parallel recesses (30) of the sliding block (18) rest against the also parallel long sides (22) of the intermediate element (12). During a radial expansion of the friction ring (2) and the linking element (4) the sliding block (18), which is not shown in FIG. 3, is able to move in radial direction (38) in parallel to the long sides (22) of the intermediate element (12). In FIG. 1 the radial direction (38) corresponds to a normal on the drawing plane. It should be noted that oblong recesses (20) in the example on hand are only envisioned for the linking element (4). The friction ring (2) which includes an inner retainer ring (21), which in turn features fixing holes (23), shows in this embodiment circular bores, which do not allow radial movements. Hence the radial movement occurs exclusively in the oblong recesses (20) of the linking element (4). The radial expansion of the threaded fastener arrangement (6) is provided through the sliding block (18).

In principle it is possible to constitute the oblong recesses (20) for the compensation of the radial play by a slotted hole in the linking element (4). It may also be useful to utilize circular recesses in the linking element (4) while the radial compensation is constituted through oblong recesses or slatted holes in the retainer ring (21) of the friction ring (2).

The intermediate Element (12) maybe made from a resilient stainless steel. By this it can be prevented that at high temperatures and through a high pre-stressing of the threaded fastener arrangement (6) the relatively soft aluminum material of the linking element (4) is pushed into the relatively hard material of the screw head (34) or the washer (32). The resilience of the intermediate element (12) thereby prevents irreversible material deformation in the linking element (4).

As shown in FIG. 1 the sleeve element (14) is slightly shorter than the total distance between the washer (32) and the nut (10). This is necessary to avoid crushing of the sleeve element (14) while the threaded fastener arrangement is mounted. The residual play of the sleeve element (14) along the shaft (16) of the screw can range between 1 mm and 6 mm. Hence the sliding block (18) is not supported by the sleeve element (14) throughout its entire length. An air gap (40) remains between the shaft (16) of the screw and the sliding block (18). The sliding block (18) however is separated from the shaft (16) of the screw (8) fundamentally by the sleeve element (14). The air gap (40) is kept small enough to prevent canting of the sliding block (18). It is also conceivable to constitute the sleeve element (14) as part of the sliding block (18). However the embodiment with the two parts is more cost efficient.

We claim:

1. A brake disk with a friction ring (2) made of a carbon fiber reinforced ceramic, a linking element (4) made from an aluminum alloy and a threaded fastener arrangement for the connection of linking element (4) and friction ring (2), in which the threaded fastener arrangement comprises at least one screw (8), a nut (10) and an intermediate element (12) which prevents a direct contact of the friction ring (2) and the linking element (4), wherein the intermediate element (12) is essentially U-shaped with two long sides (22), provides a resilient force between friction ring (2) and linking element (4) in the axial direction and features on its long sides (22) flaps (24) with resilient moldings (26, 42) for the engagement with oblong recesses (20) of the linking element (4), the flaps (24) are bent such that they are positioned above boundaries (36) of the oblong recesses (20) of the linking element, thereby retaining the intermediate element (12) also in radial direction within these oblong recesses (20), a sliding block (18) is provided, the intermediate element (12) is arranged such that it at least partially encloses the sliding block (18) to compensate for a radial movement of the friction ring (2) and the linking element (4), and the friction ring (2) features an inner revolving retainer ring (21) with fixing holes (23).

2. The brake disk according to claim 1, wherein the oblong recesses (20) extend in radial direction to retain the threaded fastener arrangement (6).

3. The brake disk according to claim 1, wherein the intermediate element (12) features a radial suspension (46) with respect to the linking element (4).

* * * * *